United States Patent
Degner et al.

(10) Patent No.: US 11,320,214 B2
(45) Date of Patent: May 3, 2022

(54) DEVICE FOR COOLING, HEATING OR TRANSFERRING HEAT

(71) Applicant: Degner GmbH & Co. KG, Alfeld (DE)

(72) Inventors: Helmut Degner, Alfeld (DE); Wladimir Ostapenko, Alfeld (DE)

(73) Assignee: DEGNER GMBH & CO. KG, Alfeld (DE)

( * ) Notice: Subject to any disclaimer, the term of this patent is extended or adjusted under 35 U.S.C. 154(b) by 155 days.

(21) Appl. No.: 16/614,656

(22) PCT Filed: May 11, 2018

(86) PCT No.: PCT/EP2018/025137
§ 371 (c)(1),
(2) Date: Nov. 18, 2019

(87) PCT Pub. No.: WO2018/210455
PCT Pub. Date: Nov. 22, 2018

(65) Prior Publication Data
US 2020/0191503 A1 Jun. 18, 2020

(30) Foreign Application Priority Data
May 16, 2017 (DE) .......................... 102017004671.9

(51) Int. Cl.
*F28F 7/02* (2006.01)
*B23P 15/26* (2006.01)
(Continued)

(52) U.S. Cl.
CPC ................ *F28F 7/02* (2013.01); *B33Y 80/00* (2014.12); *B23P 15/26* (2013.01); *F28F 9/0251* (2013.01);
(Continued)

(58) Field of Classification Search
CPC ........ F28D 7/0008; F28D 7/1684; F28F 7/02; F28F 9/0251; F28F 2210/02; F28F 2210/10; F28F 2220/00; F28F 2250/106
See application file for complete search history.

(56) References Cited

U.S. PATENT DOCUMENTS

| 4,898,233 A | 2/1990 | Grehier et al. |
| 5,179,853 A * | 1/1993 | Nicoletti ................. F28F 9/262 72/333 |

(Continued)

FOREIGN PATENT DOCUMENTS

| CN | 86102864 A | 10/1986 |
| CN | 1864044 A | 11/2006 |

(Continued)

OTHER PUBLICATIONS

Search Report (and also a Decision to Grant) of the Russian Patent Office (Federal Institute for Industrial Property) dated Apr. 8, 2020, issued in related Russian Patent Application No. 2019141302.
(Continued)

*Primary Examiner* — Eric S Ruppert
*Assistant Examiner* — Hans R Weiland
(74) *Attorney, Agent, or Firm* — Fox Rothschild LLP; Gary Hecht; P. Marshall Ticer

(57) ABSTRACT

The invention relates to a device, comprising at least one flow chamber (20') having an inlet opening and an outlet opening, said flow chamber being provided for the flow of a medium therethrough. The flow chamber (20') is arranged in a single-piece block element (2) and is at least partly delimited by a diathermal wall in order to effect absorption or release of thermal energy through the wall by means of the medium. The at least one flow chamber (20') is formed in the block element (2) from a plurality of first channels (22) spaced apart from each other, which extend straight and parallel to each other, and a plurality of second channels (23)
(Continued)

spaced apart from each other, which extend straight and parallel to each other, the first and the second channels (22, 23) each having two ends and being closed at least at one (27) of the two ends. The second channels (23) are arranged at an angle to the first channels (22), the first channels and the second channels thus crossing. Support pillars (21) having a parallelogram-shaped cross-section are present within each flow chamber (20') between the crossing points of two adjacent first channels (22) and two adjacent second channels (23). A turbulent flow of the medium can be produced very effectively in the device according to the invention.

22 Claims, 5 Drawing Sheets

(51) Int. Cl.
  *F28F 9/02* (2006.01)
  *B33Y 80/00* (2015.01)
(52) U.S. Cl.
  CPC ....... *F28F 2210/02* (2013.01); *F28F 2220/00* (2013.01); *F28F 2250/102* (2013.01)

(56) References Cited

U.S. PATENT DOCUMENTS

| | | | | |
|---|---|---|---|---|
| 5,213,153 | A * | 5/1993 | Itoh | F28F 7/02 165/104.33 |
| 5,373,634 | A * | 12/1994 | Lipp | F28F 7/02 165/185 |
| 5,590,708 | A | 1/1997 | Ulrich | |
| 8,616,269 | B2 | 12/2013 | Besant et al. | |
| 10,107,555 | B1 * | 10/2018 | Miller | F28F 7/02 |
| 10,365,051 | B2 | 7/2019 | Wang | |
| 10,583,535 | B2 * | 3/2020 | Caimano | F28F 9/0212 |
| 2005/0221150 | A1 * | 10/2005 | Revol | H01M 8/0258 429/434 |
| 2006/0194159 | A1 | 8/2006 | Franz et al. | |
| 2009/0320499 | A1 | 12/2009 | Muller et al. | |
| 2010/0101755 | A1 * | 4/2010 | Morini | F28F 7/02 165/53 |
| 2014/0251585 | A1 * | 9/2014 | Kusuda | F28D 7/0058 165/164 |
| 2015/0368125 | A1 | 12/2015 | Liang et al. | |
| 2016/0116222 | A1 * | 4/2016 | Shedd | F28F 7/02 165/166 |
| 2016/0202003 | A1 * | 7/2016 | Gerstler | F28D 7/0008 165/165 |
| 2016/0290738 | A1 | 10/2016 | Kupiszewski et al. | |
| 2017/0356696 | A1 * | 12/2017 | Zaffetti | F28F 7/02 |
| 2018/0187984 | A1 * | 7/2018 | Manzo | F28F 7/02 |
| 2018/0245854 | A1 * | 8/2018 | Sabo | F28F 7/02 |

FOREIGN PATENT DOCUMENTS

| | | |
|---|---|---|
| DE | 4017749 A1 | 12/1991 |
| DE | 10305031 A1 | 9/2004 |
| DE | 102005050118 A1 | 4/2007 |
| DE | 102012202276 A1 | 8/2013 |
| EP | 0658737 A2 | 6/1995 |
| EP | 1777479 A2 | 4/2007 |
| JP | 2016004806 A | 1/2016 |
| JP | 6056928 B1 | 1/2017 |
| RU | 59785 U1 | 12/2006 |
| SU | 488055 A1 | 10/1975 |
| WO | 2009136277 A1 | 11/2009 |
| WO | 2011115883 A2 | 9/2011 |
| WO | 2015110578 A1 | 7/2015 |
| WO | 2016057443 A1 | 4/2016 |
| WO | 2017053184 A1 | 3/2017 |

OTHER PUBLICATIONS

English translation of Search Report of the Chinese Patent Office (Chinese National Intellectual Property Administration) dated Sep. 27, 2020, issued in related Chinese Patent Application No. 2018800468183.

German Office Action dated Jan. 6, 2022 in German Patent Application No. 10 2017 004 671.9.

* cited by examiner

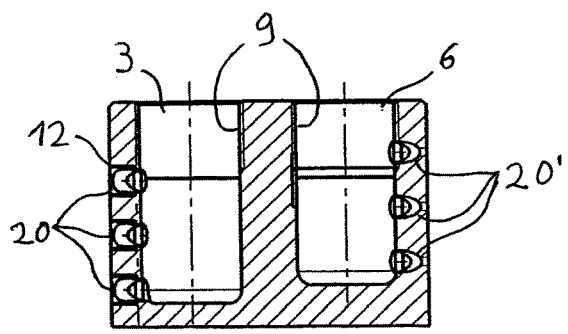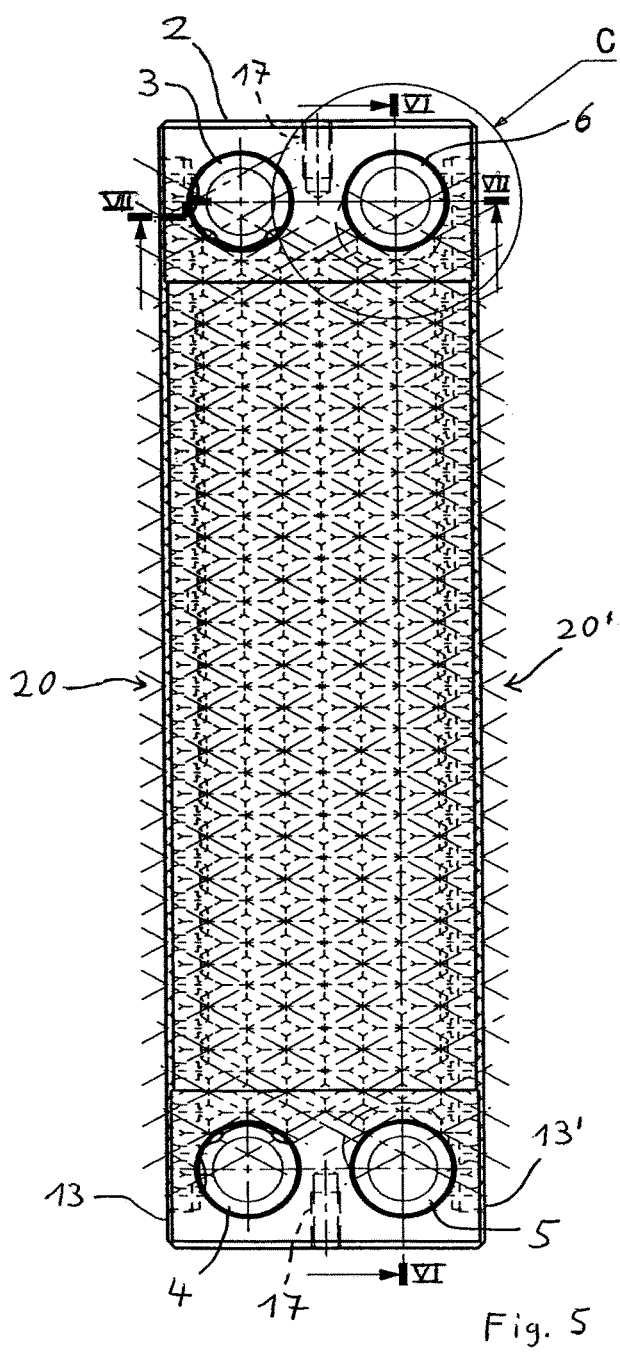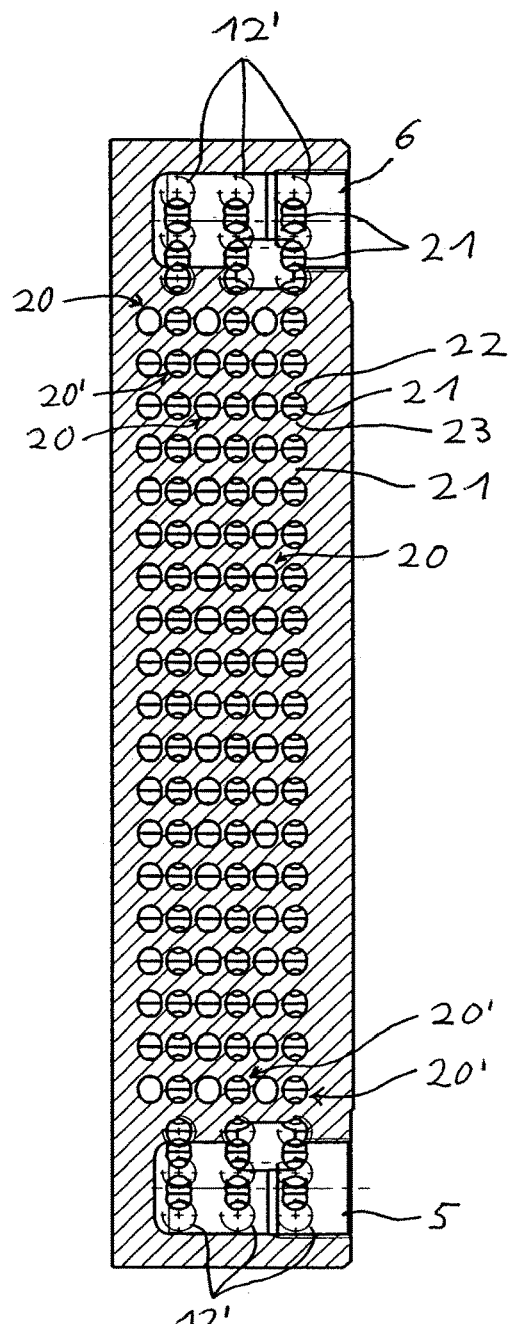

DEVICE FOR COOLING, HEATING OR TRANSFERRING HEAT

BACKGROUND OF THE INVENTION

The invention relates to a device according to the preamble of claim 1. The device can be in particular a cooling device for cooling an object or a heating device for heating an object. In particular, the device can be a cooling plate or a heating plate or hot plate. Furthermore, such a device can also be referred to as a heat exchanger. Furthermore, the invention relates to a method for producing such a device.

A heat exchanger which has plates stacked one on top of the other which form a first and a second internal fluid path is described in DE 102012202276 A1. The plates and disk-like turbulators which are arranged between the plates and provide a turbulent flow are soldered together. However, soldering points have the disadvantage that they can become defective, whereby the different media can then mix or contamination of the media can even take place. This problem does not occur in the case of single-part or single-piece heat exchangers which can also be referred to as monoblock heat exchangers.

WO 2009/136277 A1 discloses a cooling plate for absorbing heat. This cooling plate is a monoblock having an inlet opening and an outlet opening to allow the flow of a cooling fluid therethrough. This fluid flows through a channel system having channels which are configured as blind holes. Although the blind holes are arranged partially at a right angle to one another, the flow of the fluid will be substantially laminar. The ends of the blind holes are closed with plugs.

WO 2017/053184 A1 describes a monoblock heat exchanger which is produced by an additive manufacturing method, in which in particular a 3D printer can be used. A further monoblock heat exchanger which is likewise produced by such a method is described in WO 2016/057443 A1. In order to generate a turbulent flow of liquid used for transferring heat, provision is made for this liquid to flow in a zigzag or sawtooth pattern.

WO 2011/115883 A2 discloses a single-piece heat exchanger which has channel systems for different liquids comprising channels which branch and have diameters of a size variable over their length. The channels or channel systems are open at two ends. In order to produce the heat exchanger, layer production is provided e.g. by means of selective laser melting. In these channel systems, the liquids are assumed to flow in a laminar manner. Turbulators are not provided.

A heat exchanger comprising honeycombed flow gaps is described in DE 10305031 A1. The heat exchanger has a heat transfer element which is produced from an aluminium alloy in the extrusion process. The flow gaps have turbulence generators which can be an insert element in the shape of a cross or double-cross. The ends of the heat transfer element are each connected to an end piece specifying the flow channels and having inlet and outlet openings.

A device of the type in question is described in EP 0658737 A2. This is a heat exchanger which has a monoblock consisting of ceramic material with at least two channel systems. The channels of one channel system can cross with the channels of the other channel system in terms of arrangement. It is not possible to mix the media by reason of the geometric arrangement of the channels. The channels are bores which are open at both ends, wherein a plate is provided for closing purposes. The channel systems have a cross-section in the form of an elongate slot, wherein walls having overlapping circular arcs are formed through the bores. Turbulators are not provided in this heat exchanger block.

SUMMARY OF THE INVENTION

The object of the invention is to provide a device of the type in question, in which a turbulent flow of the medium is generated very effectively. Furthermore, it is an object of the invention to provide a method for producing such a device.

This object is achieved by the features of the present invention. In one form the device has at least one flow chamber which is provided to allow the flow of a medium therethrough and has an inlet opening and an outlet opening. The flow chamber is arranged in a single-piece block element which can also be referred to as a monoblock element. It has at least in part a diathermal wall and so the medium can absorb or release thermal energy or heat energy through this wall. The medium can be in particular gas or liquid. The flow chamber is formed form a plurality of first channels and a plurality of second channels which are arranged in the block element. The first channels are spaced apart from one another and extend straight and in parallel with one another. The second channels are spaced apart from one another and extend straight and in parallel with one another. Both the first and the second channels each have two ends and are closed at least at one of the two ends.

The second channels extend at an angle to the first channels such that the first and the second channels cross. Between four crossing points of two adjacent first and two adjacent second channels, support pillars are located within the flow chamber formed by the channels. These support pillars have over their height or length a cross-section in the shape of a parallelogram. This shape can also be referred to as a rhomboid or as being diamond-like. Since the flow chamber is formed from a row of crossing, straight channels which pass through one another at their crossing points, it could also be referred to as a channel system. Here, the support pillars are referred to as part of the respective flow chamber. The flow chamber is thus characterised in that a plurality of such support pillars are arranged within the flow chamber apart from chamber edge regions, wherein the support pillars extend between two mutually opposite walls of the flow chamber.

The multiplicity of regularly arranged support pillars ensures that the flow of the medium through the flow chamber is generally not laminar but instead is turbulent. Furthermore, the support pillars allow the block element and thus the device to have a high pressure resistance. The pressure resistance is produced by the large number of support surfaces which are provided by the parallelogram-shaped cross-sections of the support pillars. The support surfaces support opposite walls of the flow chamber against one another and hold them together. The device in accordance with the invention can have e.g. a pressure resistance of 150 bar. By reason of this high pressure resistance, the flow rate of the medium can be relatively high, whereby a turbulent flow is more likely to occur, than at a low rate.

Preferably, the first channels have a uniform cross-section over their length apart from their end regions, when the channels are considered in their own right and the points at which they cross with the second channels are not taken into consideration. In other words, this means that the channels, when produced as a bore (see below), have the same diameter over their length. Preferably, this also applies correspondingly to the second channels. Preferably, the first and second channels also have an identical cross-section when compared with one another. Then, the cross-sectional surfaces of the support pillars are also uniform, apart from support pillars on the edges of the flow chamber. The diameters of the channels influence the physical data of the device, such as heat output and pressure drop in the flow chamber.

If the distances between mutually adjacent first channels and the distances between mutually adjacent second channels are also the same and the distances between the first and the second channels are the same, the support pillars have a diamond-like cross-section. The structure of the flow chamber then has a particularly high degree of regularity, which is favourable for a high pressure resistance of the flow chamber and thus also for the generation of a turbulent flow.

Provision can also be made that in each case one of the first channels and one of the second channels have, at one of their respective two ends, a common channel opening and this channel opening is arranged in a side wall of the block element and constitutes a side wall opening. The device then has at least one closure means, by means of which the side wall openings can be closed in a sealing manner. Preferably, provision is made that all of these common channel openings of a flow chamber are located in the same side wall of the block element.

The side wall openings easily permit cleaning and visual inspection of the respective flow chamber and thus of the device in accordance with the invention. A further very substantial advantage of the side wall openings is that the first and second channels can be a bore. This is a preferred embodiment and means that the channels have been produced or are produced by boring by means of a rotating tool or else also by bore-eroding or laser boring. In particular, the production of the channels by means of a rotating tool can be effected relatively simply in comparison with the production of a block element having channels which are closed at their two ends, wherein namely an additive production method or 3D printing is required. The production of the channels by means of a rotating tool is considerably less complex and relatively cost-effective in comparison with the production of channels, closed at both ends, by means of an additive manufacturing method. However, on the other hand the advantages provided by the use of a single-piece block element are retained (see above), namely that no soldering points, welding seams or seals are provided between components of a flow chamber system. Therefore, it is not possible to mix different media if a plurality of chambers are provided (see below). The omission of seals, in particular also dual seals, in relation to the arrangement of flow chambers means that no sealing grooves, no adhesion or positioning of seals are required and tension forces are omitted. Furthermore, the block element is very capable of performing an internal movement in the form of expansion or contraction by reason of temperature changes.

By reason of the crosswise arrangement of the first and second channels, the two end regions of the arrangement of the side wall openings can also have those openings which do not constitute a common side wall opening but instead constitute only the channel opening of a first or a second channel.

The first and second channels can have a round cross-section, preferably they are circular. Then, even though the support pillars have curved lateral surfaces, they have a parallelogram-shaped cross-section over their height.

Provision can be made that each side wall opening has a thread which serves to fasten a plug screw in order to close the side wall opening in a sealing manner. The plug screw can be a hexagon socket screw having a seal, such as an O-ring. By reason of the inventive arrangement of the first and second channels, a first and a second channel can be closed at the same time using a plug screw. The plug screws can be standard parts and provide a reliable seal. If necessary, they can be quickly replaced. Sealing materials which can be used for plug screws are e.g. nitrile rubber (NBR), ethylene propylene diene rubbers (EPDM) or Viton. Plug screws provide a reliable seal and ensure a uniform distribution of forces to a seal. Furthermore, they are very capable of also performing an above-described internal movement of the block element.

The side wall openings can initially be somewhat elliptical by reason of their oblique arrangement with respect to the longitudinal axis of a channel having a circular cross-section in the production process. Therefore, provision can be made that this elliptical shape is bored prior to the procedure of cutting the thread into a circular shape.

The side wall openings can also be closed by a cover in the form of a closure strip or closure plate which sealingly covers all of the channel openings of a flow chamber or all of the channel openings in a side wall together.

The first and second channels can also cross at an angle of less than 90 degrees, preferably at an angle of 45 to 75 degrees and more preferably at an angle of 55 to 65 degrees.

In particular, provision can be made that the value of the angle of the first and second channels with respect to the side wall of the block element is the same and is also referred to hereinafter as the setting angle. Such symmetry of the setting angles with respect to the side wall can provide a particularly high degree of regularity in the flow chamber. The setting angle likewise influences the physical data of the device, such as heat output and pressure drop in the flow chamber.

The device in accordance with the invention can have a flow chamber which is provided to allow the flow of a heat-releasing medium therethrough, and can also have a flow chamber which is provided to allow the flow of a heat-absorbing medium therethrough. The respective diathermal wall of the flow chambers is then a common wall which separates the two flow chambers from one another. Instead of the above term "heat", it would also be possible to use the term "heat quantity". This embodiment of the device in accordance with the invention is a heat exchanger. As described above, it is not possible to mix the different media, by reason of the inventive arrangement of the flow chambers in a single-piece or solid block element. In the case of the embodiment of a heat exchanger, the above-described high pressure resistance of the device in accordance with the invention allows a high system pressure to prevail within one flow chamber and allows a considerably lower system pressure to prevail within an adjacent flow chamber.

Preferably, the two flow chambers are arranged such that in each case a support pillar of the first flow chamber and a support pillar of the second flow chamber are arranged in a congruent manner. This means that the second flow chamber, rotated quasi through 180 degrees, is arranged above the first flow chamber and so the support pillars are arranged precisely one above the other. This ensures that the block element is held together in a robust manner.

Of course, a plurality of flow chambers can be provided to allow the flow of the heat-releasing medium therethrough and a plurality of flow chambers can be provided to allow the flow of the heat-absorbing medium therethrough, wherein the flow chambers are arranged in an alternating manner.

The transfer of heat can be particularly effective by virtue of the fact that the inlet openings and the outlet openings of the at least two flow chambers are arranged such that the heat-releasing medium and the heat-absorbing medium flow in counterflow to one another through the flow chambers. Preferably, all of the flow chambers for the heat-releasing medium and all of the flow chambers for the heat-absorbing medium each have a common inlet opening and a common outlet opening.

Preferably, provision is made that all of the channel openings of the at least one flow chamber for a heat-releasing medium are arranged in the same side wall of the block element and all of the channel openings of the at least one flow chamber for a heat-absorbing medium are arranged in an opposite side wall of the block element. In this manner, two adjacent flow chambers can be located relatively closely against one another or have a relatively thin wall which separates the two chambers from one another. In this manner, effective heat transfer and a compact construction of the block element can be achieved.

Flow chambers which are provided for different media can have different cross-sectional surfaces. Different cross-sectional surfaces can be easily achieved by virtue of the fact that the diameters of the channels are selected to be different from one another compared with two flow chambers. The first and second channels of each same flow chamber can have identical cross-sections. In particular, in this manner the flow chambers can also have different volumes in dependence upon the different media. This is practical because different media regularly have different viscosities.

At two end sides, the block element can have in each case one or a plurality of threads which are used for fastening the block element to another component.

Various materials can be used as the material from which the block element is produced. In particular, the block element can be produced from an aluminium alloy. It is cost-effective and is very suitable for producing the channels by means of a rotating tool. The block element can undergo passivation, coating and/or surface treatment and in particular both externally and internally.

This object is also achieved by the methods described herein.

BRIEF DESCRIPTION OF THE DRAWINGS

The invention will be explained in greater detail hereinafter with reference to an exemplified embodiment, wherein reference is made to the figures. In the figures:

FIG. 5 shows a plan view of the block element of FIG. 1, wherein the arrangement of the flow chambers is illustrated, FIG. 6 shows a sectional view along the sectional line VI-VI in FIG. 5, FIG. 7 shows a sectional view along the sectional line VII-VII of FIG. 5.

DETAILED DESCRIPTION OF THE INVENTION

Figure 1:
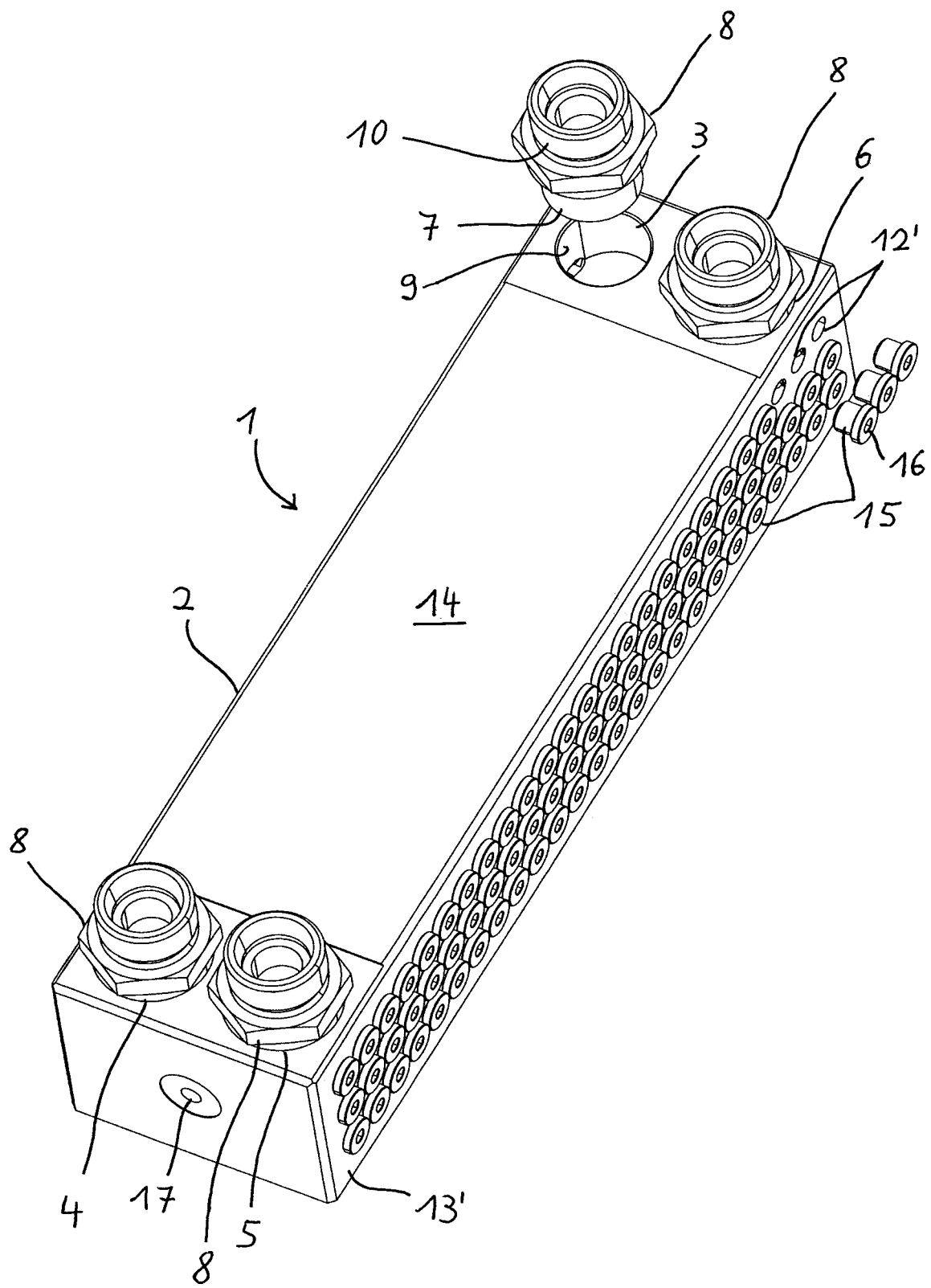
FIG. 1 shows a perspective view of a device in accordance with the invention which is a heat exchanger.

In the figures, like features are designated in part by like reference numbers. The heat exchanger is designated by the reference number 1 and has a single-piece aluminium block element 2 which is produced preferably from AlMgSi1 and has good conductivity. The block element 2 has an inlet opening 3 and an outlet opening 4 for a first medium, and furthermore has an inlet opening 5 and an outlet opening 6 for a second medium. The media can be in particular a liquid or a gas. Furthermore, the heat exchanger 1 has four screw-in fittings 8 which are screwed by means of a thread 7 into the openings 3 to 6, which have a corresponding internal thread 9, using a seal (not shown). Furthermore, the screw-in fittings 8 have an external thread 10 in order to connect hoses for the media.

The block element 2 has a total of six flow chambers 20 and 20' arranged one above the other and of which three are provided to allow the flow of the first medium therethrough and three are provided to allow the flow of the second medium therethrough. The flow chambers 20, 20' are arranged in an alternating manner and so in each case one flow chamber 20 for the first medium and one flow chamber 20' for the second medium are separated from one another by a common wall.

Each flow chamber 20 has a plurality of channel openings 12 and each flow chamber 20' has a plurality of channel openings 12' which are each located in one of the two side walls 13 and 13' of the block element 2. Since the flow chambers 20, 20' are arranged in parallel with a surface 14 of the block element 2, a horizontal row of channel openings 12, 12' belongs in each case to one of the flow chambers 20, 20'.

Figure 4A:
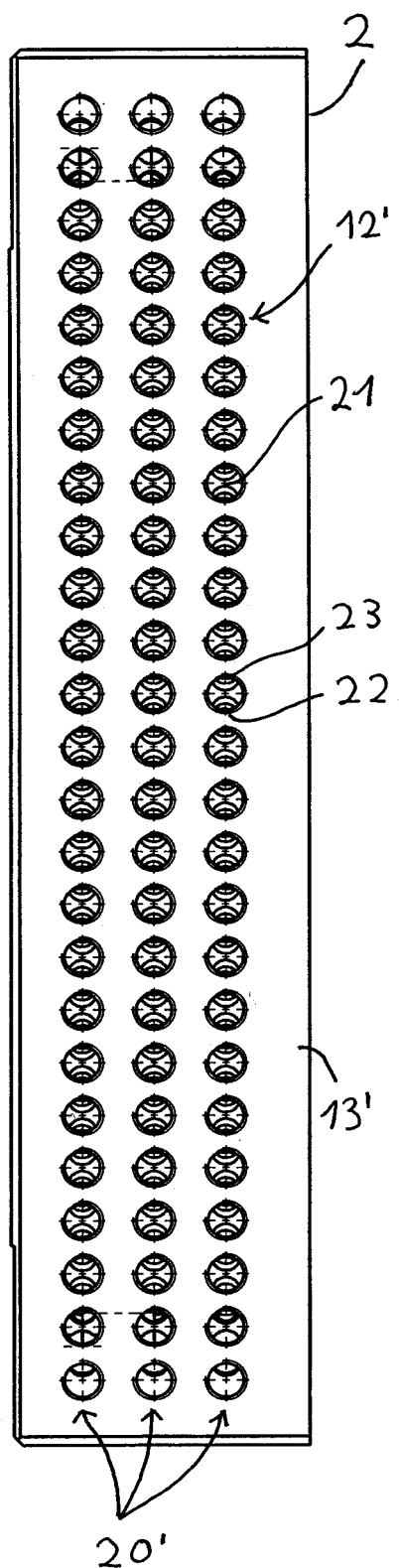
FIG. 4b shows a left side view of a single-piece block element of the heat exchanger of FIG. 1.
Figure 4B:
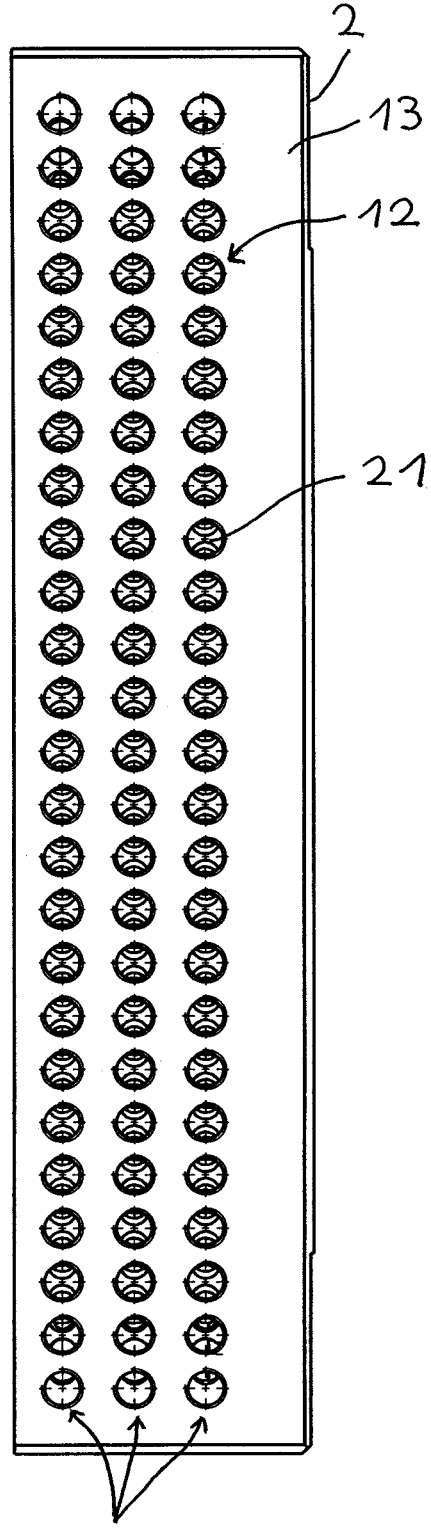

In FIG. 4a, all of the channel openings 12' can be seen in the right side wall 13' and in FIG. 4b all of the channel openings 12 can be seen in the left side wall 13. The channel openings 12 belong to the flow chambers 20 of the first medium and the channel openings 12' belong to the flow chambers 20' of the second medium. In FIG. 1, all apart from three of the channel openings 12' are closed by means of plug screws which have an O-ring as a seal and a hexagon socket head. For this purpose, each channel opening 12, 12' has a thread.

Figure 2:
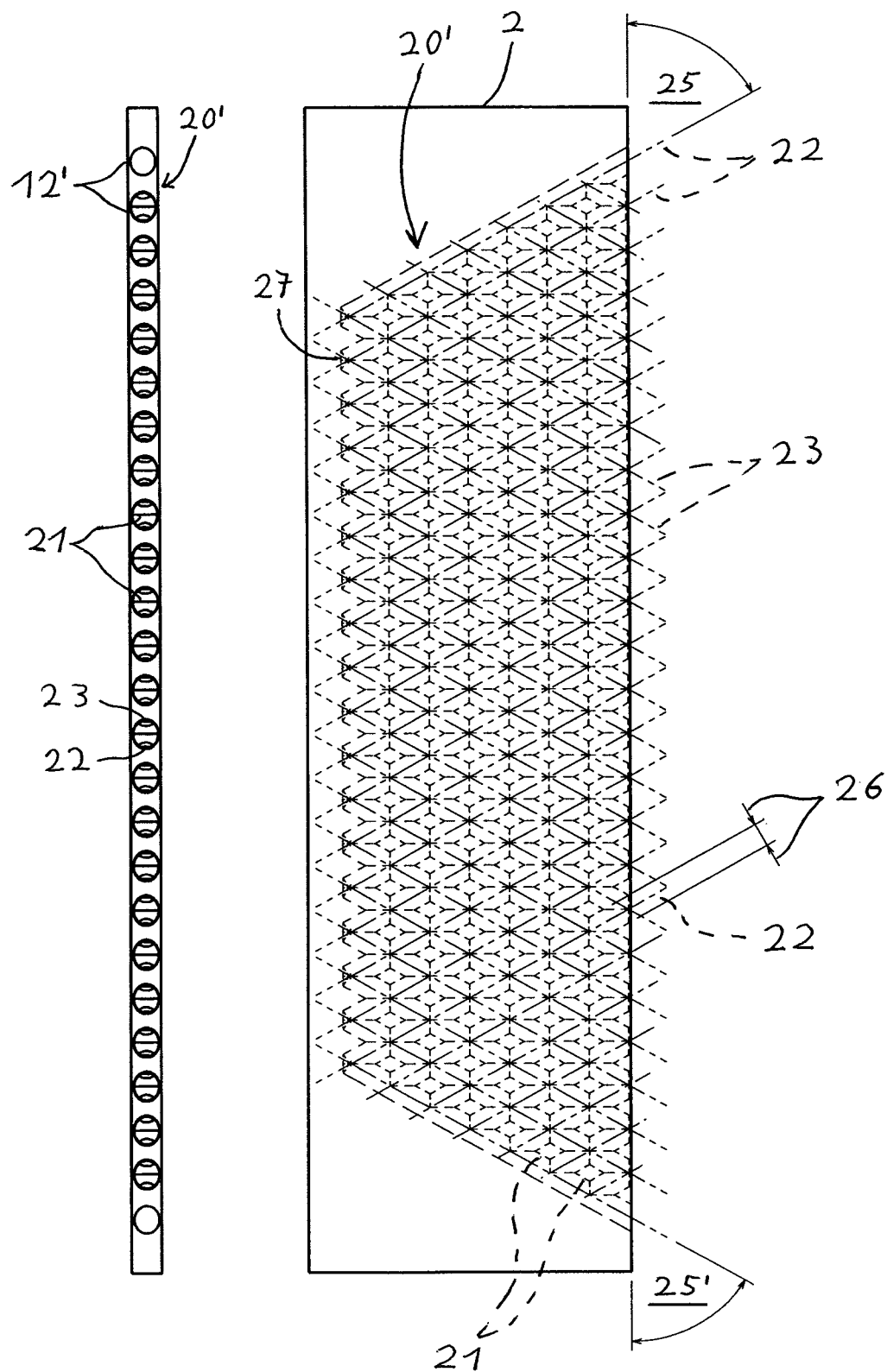
FIG. 2a shows a cross-sectional surface of a flow chamber of the heat exchanger of FIG. 1.
FIG. 2b shows a side view of the flow chamber of FIG. 2a before common channel openings have been provided with threads.
Figure 3:
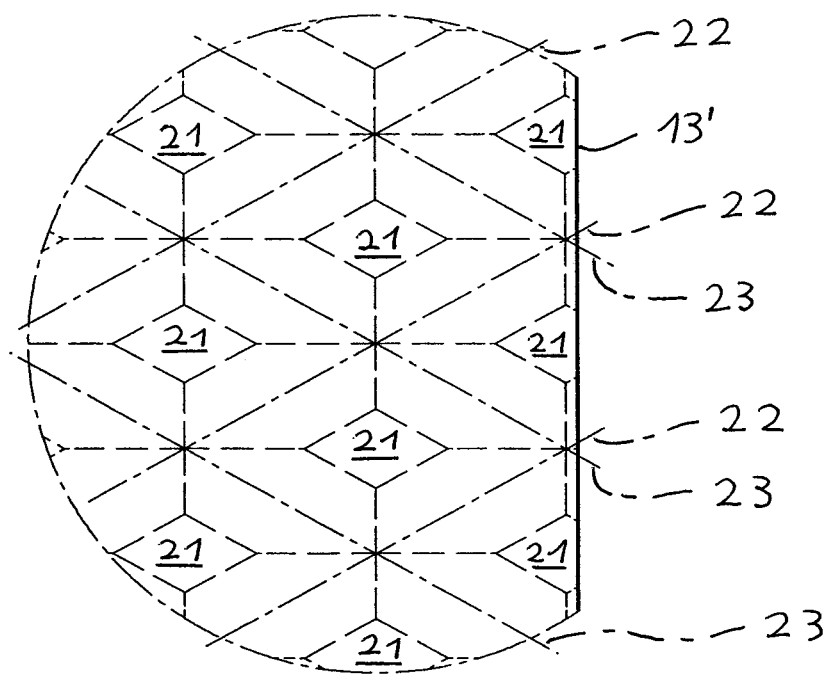
FIG. 3 shows a detail of the cross-sectional surface of FIG. 2a, FIG. 4a shows a right side view of a single-piece block element of the heat exchanger of FIG. 1.

At both end sides, the block element 2 has a connecting thread 17 for fastening the heat exchanger 1 within an assembly. FIGS. 2a and 2b show a flow chamber 20' of the second medium. A detail of this cross-sectional surface is illustrated in FIG. 3. A multiplicity of support pillars 21 having a diamond-shaped cross-section can be seen. The support pillars 21 are formed by a multiplicity of circular bores which constitute first channels 22, and by a multiplicity of circular bores which constitute second channels 23. In FIG. 3, the channels 22 are illustrated by broken lines which extend along the channel longitudinal direction. By reason of the circular cross-section of the respective channel 22, the lowest-lying extension of the channel 22 extends along the broken line, wherein the same applies to the second channels 23. The first channels 22 have a positive setting angle 25 with the side wall 13' and the second channels 23 have a negative setting angle 25' with the side wall 13' of the same value. The arrows 26 designate the width of a first channel 22.

The first and second channels 22, 23 have channel openings 12' which can be seen in FIG. 2b and which are common channel openings apart from two outer channel openings. The plan view according to FIG. 2b shows in the center a support pillar 21 which has a diamond-shaped cross-section. The opposite ends 27 of the channels 22, 23 are closed. In FIG. 2b, the channel openings 12' are still in a state before they have been bored into a circular shape and provided with a thread, and thus still have a somewhat elliptical shape.

Accordingly, a flow chamber 20 for the first medium is structured, wherein it is arranged, rotated through 180 degrees in terms of the arrangement, underneath the flow chamber 20' and between two flow chambers 20'. The respective support pillars 21 lie congruently one on top of the other.

In FIG. 6, all six flow chambers 20, 20' can be seen in section, wherein likewise support pillars 21, of which one is designated by way of example by the reference number 21, are located between slightly elliptical sections through the channels 22 or 23, through which support pillars 21 can be seen. Channel openings 12' can be seen in the inlet opening 5 and the outlet opening 6. The second medium flows via the inlet opening 5 into all three flow chambers 20' and then flows from said chambers via the outlet opening 6 out of the block element 2. The same applies to the inlet opening 3 and the outlet opening 4 with regard to the first medium, wherein the flow-related connection between the flow chambers 20' and the outlet opening 6 and between the flow chambers 20 and the inlet opening 3 can be seen in particular in FIG. 7.

Figure 8:
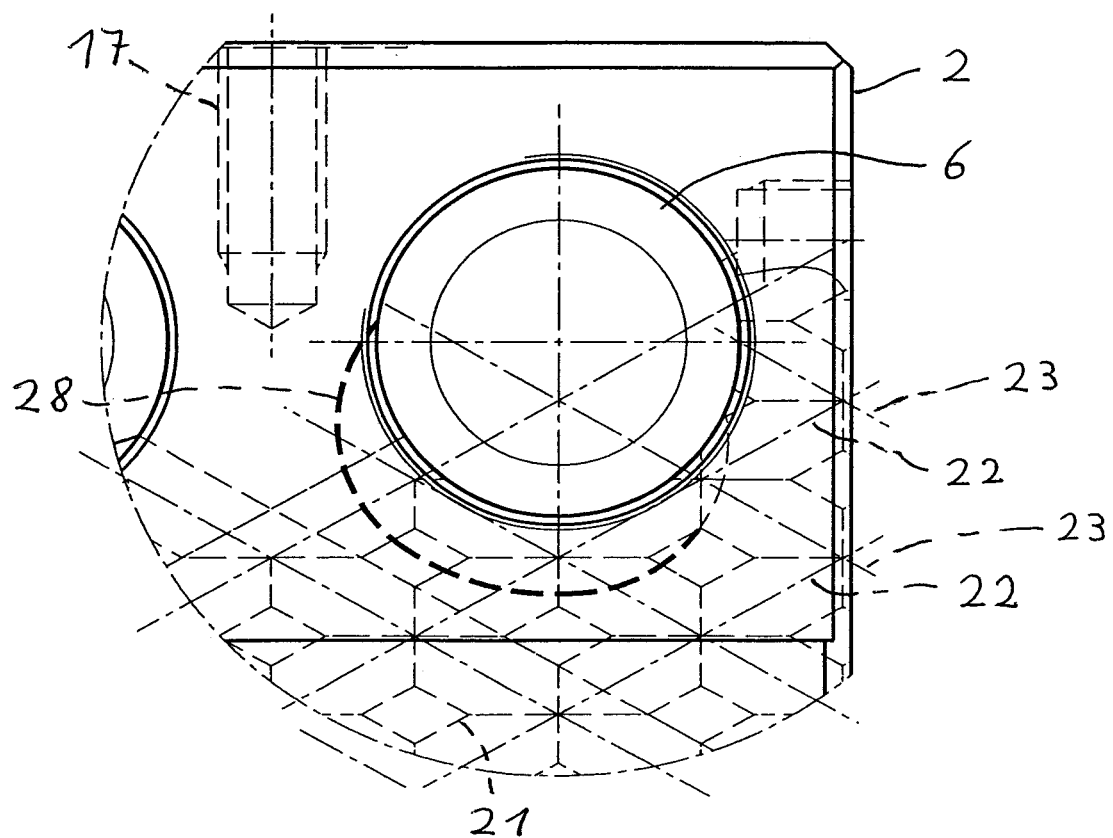
FIG. 8 shows a partial region C of FIG. 5.

In FIG. 8, the line 28 indicates a milled-out portion which serves to connect the central flow chamber 20' to the outlet opening 6 in terms of flow.

List of reference numbers:

1 heat exchanger
2 block element
3 inlet opening
4 outlet opening
5 inlet opening
6 outlet opening
7 thread
8 screw-in fitting
9 internal thread
10 external thread
12, 12' channel openings
13, 13' side walls
14 surface of 2
15 plug screws
16 hexagon socket head
17 connecting thread
20, 20' flow chambers
21 support pillars
22 first channels
23 second channels
25, 25' setting angle
26 arrows
27 closed ends of 22, 23
28 line

The invention claimed is:

1. A device for cooling, heating and transferring heat, comprising:
    a solid single-piece block element;
    at least one flow chamber arranged in the block element to allow the flow of a medium therethrough, the at least one flow chamber having an inlet opening and an outlet opening and is defined at least partially by a diathermal wall to absorb or release thermal energy through the wall taking place through the medium;
    wherein the at least one flow chamber is formed in the block element from a plurality of first mutually spaced apart channels which extend straight and in parallel with one another, and a plurality of second mutually spaced apart channels which extend straight and in parallel with one another,
    wherein the first and the second channels are produced by boring a plurality of bores having a circular cross-section, each of the first and second channels have two ends and are closed at least at one of the two ends;
    wherein the second channels are arranged at an angle to the first channels such that the first and the second channels cross,
    wherein support pillars having a parallelogram-shaped cross-section are located within the respective at least one flow chamber between the crossing points of two adjacent first and two adjacent second channels, the support pillars being formed by the boring the plurality of bores; and
    wherein the first and the second channels each have a uniform cross-section between regions of their two ends.

2. A device as claimed in claim 1,
    wherein pairs of the first and second channels have, at another of the two ends of each of the first and second channels of said pairs, a common channel opening which is arranged in a side wall of the block element as a side wall opening, and
    wherein the device has at least one closure means for closing the side wall openings in a sealing manner.

3. A device as claimed in claim 2,
    wherein the side wall openings have a thread which serves to receive a plug screw as said closure means.

4. A device as claimed in claim 1,
    wherein the first and second channels cross at an angle of less than 90 degrees.

5. A device as claimed in claim 1,
    wherein the first and second channels form angles of the same value with a side wall of the block element.

6. A device as claimed in claim 1,
    wherein the at least one flow chamber comprises a first flow chamber provided to allow the flow of a heat-releasing medium therethrough, and further comprises a second flow chamber provided to allow the flow of a heat-absorbing medium therethrough,
    wherein the diathermal wall is a common wall which separates the two flow chambers from one another.

7. A device as claimed in claim 6,
    wherein the two flow chambers are arranged such that in each case a support pillar of one flow chamber is arranged congruently above a support pillar of the other flow chamber.

8. A device as claimed in claim 6,
    wherein pairs of the first and second channels have, at another of the two ends of each of the first and second channels of said pairs, a common channel opening which is arranged in a side wall of the block element as a side wall opening; and
    wherein all of the common channel openings of the first flow chamber for a heat-releasing medium are arranged in the same side wall of the block element and all of the common channel openings of the second flow chamber for a heat-absorbing medium are arranged in an opposite side wall of the block element.

9. A device as claimed in claim 1,
wherein the at least one flow chamber includes a first flow chamber and a second flow chamber which, when compared with one another, have channels with different diameters.

10. A method for producing a device as claimed in claim 1, wherein the first and second channels are produced by boring into the block element.

11. A device as claimed in claim 4,
wherein pairs of the first and second channels have, at another of the two ends of each of the first and second channels of said pairs, a common channel opening which is arranged in a side wall of the block element as a side wall opening, and
wherein the device has at least one closure means for closing the side wall openings in a sealing manner.

12. A device as claimed in claim 11,
wherein the at least one flow chamber comprises a first flow chamber provided to allow the flow of a heat-releasing medium therethrough, and further comprises a second flow chamber provided to allow the flow of a heat-absorbing medium therethrough,
wherein the diathermal wall is a common wall which separates the two flow chambers from one another.

13. A device as claimed in claim 12,
wherein the two flow chambers are arranged such that in each case a support pillar of one flow chamber is arranged congruently above a support pillar of the other flow chamber.

14. A device as claimed in claim 7,
wherein pairs of the first and second channels have, at another of the two ends of each of the first and second channels of said pairs, a common channel opening which is arranged in a side wall of the block element as a side wall opening; and
wherein all of the common channel openings of the first flow chamber for a heat-releasing medium are arranged in the same side wall of the block element and all of the common channel openings of the second flow chamber for a heat-absorbing medium are arranged in an opposite side wall of the block element.

15. A device as claimed in claim 12,
wherein all of the common channel openings of the first flow chamber for a heat-releasing medium are arranged in the same side wall of the block element and all of the common channel openings of the second flow chamber for a heat-absorbing medium are arranged in an opposite side wall of the block element.

16. A device as claimed in claim 6,
wherein the first and second flow chambers, when compared with one another, have channels with different diameters.

17. A device as claimed in claim 1, wherein the at least one flow chamber comprises:
a first flow chamber for the flow of a heat-releasing medium therethrough; and
a second flow chamber adjacent to the first flow chamber for the flow of a heat-absorbing medium therethrough and separated from the first flow chamber at least in part by said diathermal wall.

18. A device as claimed in claim 1, wherein the first and second channels cross at an angle of 45 to 75 degrees.

19. A device as claimed in claim 1, wherein the first and second channels cross at an angle of 55 to 65 degrees.

20. A method for producing a device as claimed in claim 2, wherein the first and second channels are produced by boring into the block element.

21. A device as claimed in claim 2, wherein the at least one flow chamber comprises:
a first flow chamber for the flow of a heat-releasing medium therethrough; and
a second flow chamber adjacent to the first flow chamber for the flow of a heat-absorbing medium therethrough,
wherein said diathermal wall is a common wall that separates the first flow chamber from the second flow chamber.

22. A device for cooling, heating and transferring heat, comprising:
a single-piece block element;
at least one flow chamber arranged in the block element to allow the flow of a medium therethrough, the at least one flow chamber having an inlet opening and an outlet opening and is defined at least partially by a diathermal wall to absorb or release thermal energy through the wall taking place through the medium;
wherein the at least one flow chamber is formed in the block element from a plurality of first mutually spaced apart channels which extend straight and in parallel with one another, and a plurality of second mutually spaced apart channels which extend straight and in parallel with one another;
wherein the first and the second channels are bores and have a circular cross-section, each of the first and second channels have two ends and are closed at least at one of the two ends;
wherein the second channels are arranged at an angle to the first channels such that the first and the second channels cross;
wherein support pillars having a parallelogram-shaped cross-section are located within the respective at least one flow chamber between the crossing points of two adjacent first and two adjacent second channels;
wherein the first and the second channels each have a uniform cross-section between regions of their two ends;
wherein pairs of the first and second channels have, at another of the two ends of each of the first and second channels of said pairs, a common channel opening which is arranged in a side wall of the block element as a side wall opening; and
wherein the device has at least one closure means for closing the side wall openings in a sealing manner.

* * * * *